United States Patent [19]

Hara

[11] 4,175,435

[45] Nov. 27, 1979

[54] LIQUID LEVEL DETECTING DEVICE

[75] Inventor: Kunio Hara, Kawasaki, Japan

[73] Assignee: Nifco Inc., Tokyo, Japan

[21] Appl. No.: 932,735

[22] Filed: Aug. 10, 1978

[51] Int. Cl.$^2$ .................... G01F 73/12; H01H 36/00
[52] U.S. Cl. ................... 73/313; 73/DIG. 5
[58] Field of Search .............. 73/290 R, 309, 306, 73/307, 308, 310, 311, 313, 319, DIG. 5; 200/84 R, 84 C

[56] References Cited

U.S. PATENT DOCUMENTS

| 3,200,645 | 8/1965 | Levins | 73/313 |
|---|---|---|---|
| 3,633,193 | 5/1970 | Milo | 73/313 X |
| 3,874,237 | 4/1975 | Zwarts | 73/290 R |
| 4,064,755 | 12/1977 | Bongort et al. | 73/313 |
| 4,081,639 | 1/1977 | Tice | 73/313 X |
| 4,084,436 | 4/1978 | Smitherman | 73/313 |

*Primary Examiner*—Donald Watkins
*Attorney, Agent, or Firm*—Jack R. Halvarsea; Robert W. Beart

[57] ABSTRACT

A liquid level detecting device which comprises an annular float adapted to float constantly on the surface of a body of liquid subjected to level detection, a barrel passing through the float so as to guide the motion of the float, permanent magnets disposed in the float and a magnetically operatable lead switch disposed in the barrel permits the detection of liquid level to be effected on the principle that the lead switch is magnetically turned into its ON state at the time that the float, while in motion, reaches the position at which the barrel incorporates the lead switch.

2 Claims, 12 Drawing Figures

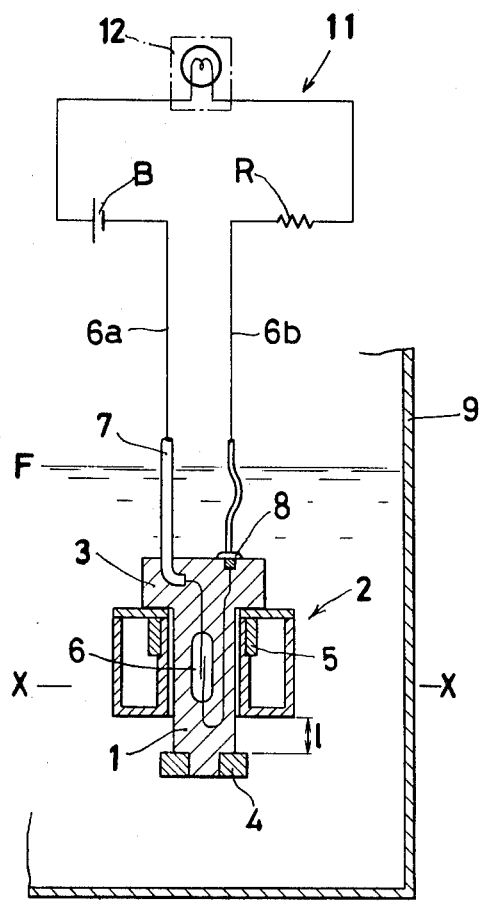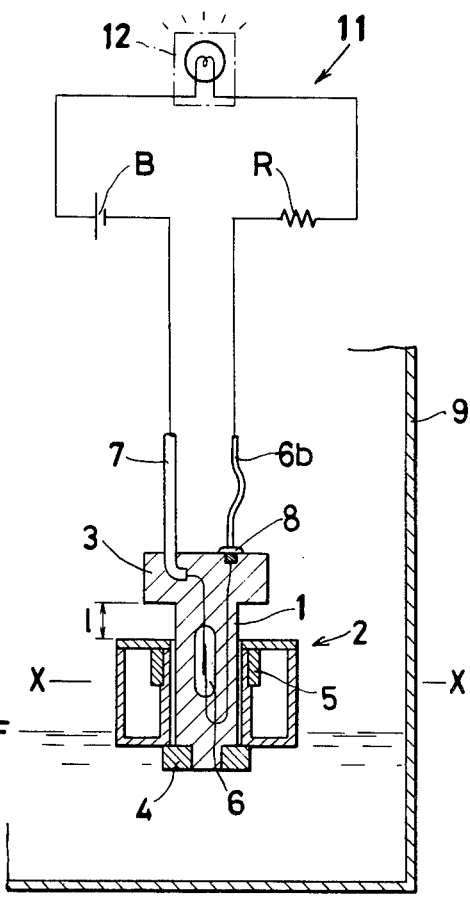

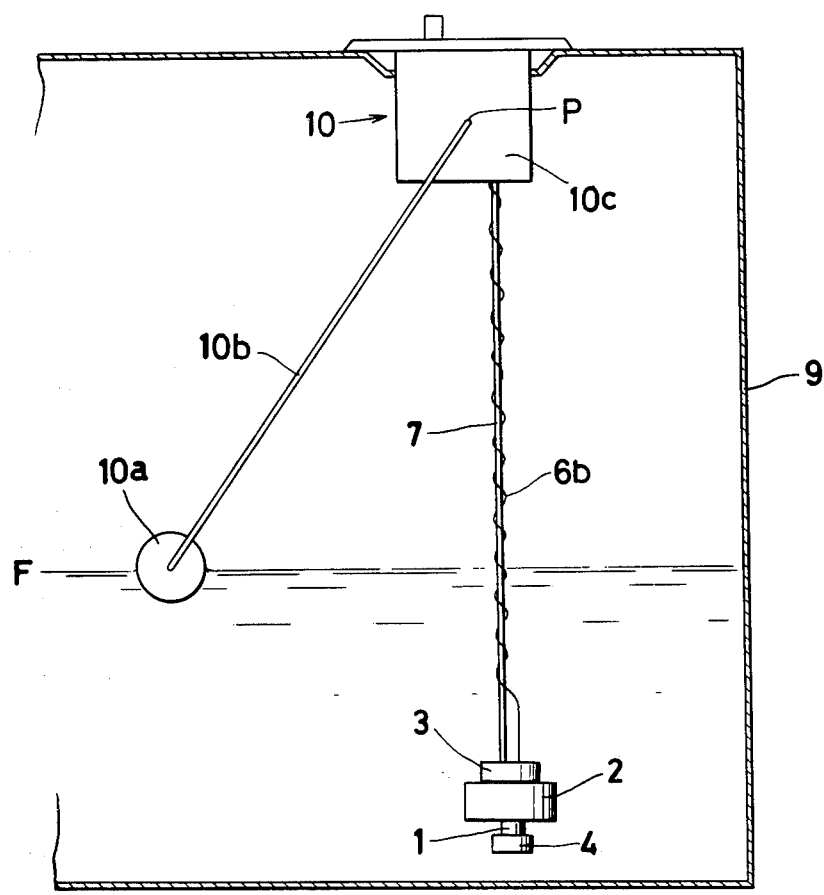
Fig_5

LIQUID LEVEL DETECTING DEVICE

BACKGROUND OF THE INVENTION

This invention relates to a liquid level detecting device which, when used in tanks and storage means for holding gasoline, oil and various other liquids, determines the presence of such liquids at prescribed positions inside such containers. More particularly, this invention relates to a liquid level detecting device of the type which serves as detection means for alarm systems adapted to detect and issue warnings when the liquid supplies in such containers are running short or for liquid volume measuring systems adapted to detect heights of liquid columns held in such containers and which further possesses a function of digital display of the results of detection.

Conventional the liquid level detecting devices serving the same purpose as that of this invention have included a device which, upon installation in a fuel tank of, for example, an automobile, detects that the fuel supply in the tank is running short and issues a proper warning to the driver such as by means of a pilot lamp. The most popular mechanism adopted for devices of this type makes effective use of a float which is attached to the free end of an arm freely rotatably attached at the other end to a pivot disposed near the bottom of the tank, whereby the float remains in a raised position when the tank is relatively full of fuel falls to a lower position as the fuel supply becomes insufficient and, as the float keeps on falling and eventually reaches a prescribed position, the terminal disposed on the underside of the float comes into contact with an opposed terminal to close a circuit and light a pilot lamp.

Such a mechanical detecting device is unreliable. Since the mechanism is completely immersed in the fuel, it undergoes accelerated deterioration and tends to incur troubles due to failure of contact. If the terminals are positioned in the space above the liquid surface and, consequently, they induce the phenomenon of chattering (repeated cycles of making and breaking contact) because of external shocks such as the vibration of the tank proper, there may possibly ensue erroneous detection and there is a possibility of the applied potential giving rise to arcs between the terminals and setting fire to the inflammable liquid as well.

For the purpose of overcoming such disadvantages of the use of mechanical means, there has been proposed a detection system designed to electrically determine the presence or absence of a liquid at a prescribed position. Such a conventional electrical detection system, however, makes use of an element in which the magnitude of electric current flowing therethrough varies when the element is enclosed with the liquid and when it is not. This variation is so slight that, for the variation in the electric current to actuate switching means of a pilot lamp effectively, there must be provided a suitable amplifier. Besides, effective conduction from the point of detection to the amplifier inevitably requires adoption of a lead wire free from appreciable loss of current and, consequently, is expensive. This system is not very economical and is not completely satisfactory in terms of circuit configuration. Furthermore since the variation in the electrical magnitude utilized for the detection is very small, noises and other similar disturbing factors finding access to the circuit from external sources frequently cause erroneous detection.

An object of this invention is to provide a liquid level detecting device which avoids the inherent disadvantages suffered by mechanical detection means and enjoys high sensitivity and accuracy and which can be manufactured inexpensively and compactly.

Another object of this invention is to provide a liquid level detecting device which can be utilized not merely as detection means for an alarm system adapted to indicate a very small balance of the liquid in the container but also as detection means in a liquid volume measuring system serving to display digitally the liquid level or liquid volume in the container.

SUMMARY OF THE INVENTION

To accomplish the objects described above according to the present invention, there is provided a liquid level detecting device which comprises a float means provided with a lead switch (or permanent magnets) and a barrel provided with permanent magnets (or a lead switch) and incorporating a pair of restricting means serving to limit the vertical motion of the float means, whereby the lead switch is selectively actuated by the permanent magnets in accordance with the position to assumed by the float means as the liquid level rises above or falls below the prescribed level and, consequently, the display unit connected to the lead switch is caused to make a display indicating whether the liquid level is above the aforementioned prescribed level or not. Digital display of the liquid level can be realized by having a multiplicity of such devices installed one on top of another.

Since the device of this invention uses a small lead switch and small permanent magnets as its operating elements, it gives ample reduction in both size and weight. It is not appreciably deteriorated by aging because its operating elements function in a state protected effectively with pieces made of synthetic resin. Thus, the accuracy of detection by the device of this invention can be retained for a long time.

The other objects and characteristic features of the present invention will become apparent from the description to be given in further detail hereinafter with reference to the accompanying drawing.

BRIEF EXPLANATION OF THE DRAWING

FIGS. 4(A) and (B) are schematic diagrams for the explanation of the operation of the first preferred embodiment of this invention.

FIG. 5 is a schematic diagram illustrating the device of FIG. 4 being operated in conjunction with an ordinary float type liquid level gauge.

DESCRIPTION OF THE PREFERRED EMBODIMENT

Figure 1:
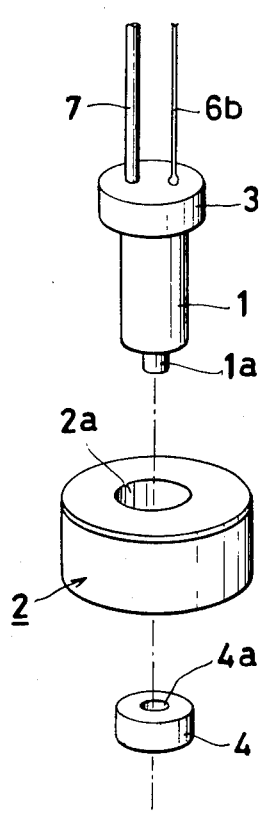
FIG. 1 is an exploded perspective view of the first preferred embodiment of the liquid level detecting device of the present invention.
Figure 2A:
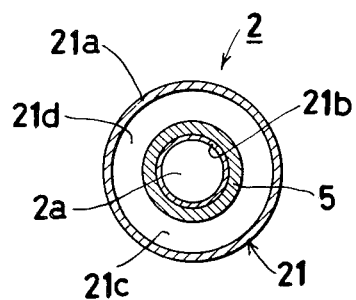
FIG. 2(A) is a cross-sectioned view of a float means used in the device shown in FIG. 1.
Figure 2B:
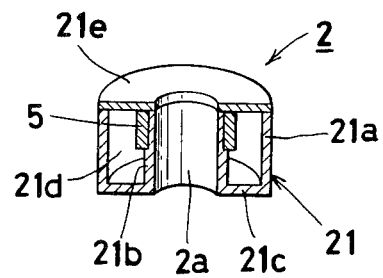
FIG. 2(B) is a partially cutaway perspective view of the float means of FIG. 2(A).

The first preferred embodiment of this invention represents a system to be used such as in the fuel tank of an automobile for detecting and issuing a warning that the fuel supply in the tank is running short, and it comprises the component elements shown in FIG. 1: The elements are a barrel 1 which has a cylindrical shape of a suitable cross section and is longest in the axial direction, an annular float 2 which is loosely inserted around the barrel and is adapted to enjoy freedom of movement in its axial direction along the periphery of the barrel, limit means 3 which serves to stop the upward movement of the float 2 and limit means which stops the downward movement of the float. In the first preferred embodiment of this invention, the upper limit means 3 is formed integrally with the barrel in the shape of a disc having a diameter greater than the diameter of the barrel and the diameter of the through hole 2a formed in the float 2 to admit the barrel. The lower limit means 4 for limiting the downward movement of the float also has a diameter greater than the diameter of the barrel and the diameter of the through hole 2a in the barrel. This is formed in an annular shape containing a through hole of a diameter barely permitting forced insertion of a shank 1a protruding from the leading end of the barrel. Assembly of this device, therefore, is simply accomplished by inserting the float 2 into the barrel 1 and thereafter bringing the lower limit means 4 into tight engagement with the shank 1a projecting from the leading end of the barrel inserted through the float. Once the device is thus assembled, the float 2 is prevented by the lower limit means from falling off the barrel. Of course, a suitable adhesive may be used to ensure thorough union between the shank 1a and the through hole 4a. Illustrated in FIGS. 2(A) and 2(B) is a typical example of the float 2. A cylindrical main body 21 of the float 2 consists of an outer wall 21a, an inner wall 21b surrounding an inner hole 2a intended for insertion of the barrel and an annular bottom wall 21c disposed at one end of the axial length of the float and adapted to keep the outer wall 21a and the inner wall 21b separated by a fixed distance in the radial direction, with a cavity 21d intervening between the inner and outer walls. Around the inner hole 2a and on the cavity side of the inner wall 21a defining the inner hole, an annular permanent magnet 5 is fastened. Although the permanent magnet may be made of any desired material, it is desired to be made of a material possessing notably high magnetic force and coercive property for its shape and size so that the float can be reduced proportionally in size and weight.

After the permanent magnet has been set in position as described above, annular cap means 21e is mounted on the free ends of the inner and outer walls 21a, 21b to enclose the interposed cavity, contributing to the buoyancy of the float 2. It is particularly important that the cap means 21e should be fastened perfectly to the free ends of the two opposed walls with the aid of an adhesive so as to ensure thorough sealing of the cavity. In the present preferred embodiment, the permanent magnet is disposed on the cavity side of the inner wall 21b. When necessary, it may be disposed in a state exposed toward the inner wall 2a. The component members of the float illustrated in FIGS. 2(A) and 2(B) are desired to be made of a suitable synthetic resin material.

Figure 3:
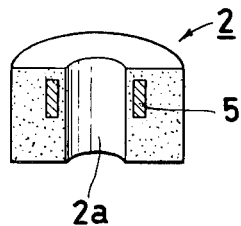
FIG. 3 is a half-sectioned perspective view of a modified version of the float means.

FIG. 3 represents another preferred embodiment of the float. When this float is formed of a suitable foaming material in a shape such as is illustrated, a permanent magnet 5 is simultaneously formed in a state buried in a unitary foamed wall.

In the two preferred embodiments of the float 2 described above, the outer shape of the floats can be selected freely and the cross section of the inner holes 2a need not necessarily be circular. When the inner hole of the float is not circular, then the barrel 1 of FIG. 1 which is inserted through the inner hole 2a ought to be given a cross section conforming with that of the inner hole 2a.

At a stated position inside the barrel 1 with which the float 2 is freely slidably attached, a suitable known lead switch 6 is buried integrally in such a way that the closing and opening of two contacts are selectively effected by the magnetic field generated by the annular permanent magnet 5 surrounding the periphery of the barrel (See FIG. 4).

The upper limit means 4 which serves to limit the upward movement of the float, in the present preferred embodiment, also functions to support the entire device in position. It is held in position by a suitable supporting rod 7.

The two lead wires 6a, 6b of the lead switch 6 effectively function insofar as they are suitably led out of the barrel interior. In the preferred embodiment illustrated in FIG. 4, the supporting rod 7 is made of a sufficiently electroconductive metal material and is internally connected to one of the wires extended from the switch so as to constitute the external lead wire 6a, while the other wire extended from the terminal 8 is made of an identical cord to constitute the external lead wire 6b. With this arrangement, only one loose external lead wire is required. If the external lead wire 6b which is in the form of a cord is spirally wound up the supporting rod 7 as illustrated in FIG. 5, it does not interfere with the operation of the device.

The barrel 1 and the upper limit means 3 may be integrally formed with a synthetic resin. Alternatively, they may be formed separately, with the barrel in a hollow shape, so that they will be fastened tightly to each other with the aid of an adhesive after the lead switch has been inserted in the cavity.

As already pointed out, the first preferred embodiment is contemplated for use as a detection system operated for the purpose of detecting a predetermined degree of shortage in the fuel supply and urging prompt replenishment of the fuel. For example, this device may be used as illustrated in FIG. 5. To be more specific, the device is used within a fuel tank of, for example, an ordinary wheeled vehicle in combination with a liquid level gauge 10 of a type widely adopted. The float 10a is adapted to follow constantly the movement of the liquid surface and the supporting rod 10b serving to carry the float is allowed to revolve around the pivotal point P on the case 10c, so that the rotation of the pivotal point P is detected in terms of resistance by the variable resistor contained inside the case 10c and the index of the meter (not shown) is swung in accordance with the resultant change in electric current forwarded via the output cord.

The device of this invention is situated close to the bottom of the tank 9 and held in position by means of the supporting rod 7. The other end of the supporting rod 7 may be fastened to whatever may prove convenient. If it is fastened to the case 10c of the liquid level gauge 10 as illustrated, then the detecting device can be set in position at the same time that the liquid level gauge 10 is fixed in the tank.

Again with reference to FIG. 4, the detecting device illustrated therein has an external circuit system 11 as a medium. This system has the lead switch 10 serially inserted in the serially connected circuit extending between a suitable power source B such as a battery and an alarm display unit 12 so that the power source is selectively connected to the display unit 12 in accordance with the closing and opening of the lead switch 6. In the illustrated embodiment, the display unit 12 is a lamp adapted to be turned on when the liquid supply in the tank has been reduced to the extent of requiring prompt replenishment.

How low the liquid surface must fall before the alarm is issued is a question to be freely decided from the standpoint of design. In the present preferred embodiment, for example, the alarm is provisionally arranged to be set off when the amount of liquid in the tank falls to the liquid level indicated as X—X.

The length of the supporting rod 7 and other factors should be fixed in such a way that the float 2 which constantly follows the movement of the liquid surface reaches its lowest possible position, i.e. the position at which the float comes into contact with the lower limit means, when the liquid surface falls to reach the set liquid level X—X. Further the position of the lead switch 6 inside the barrel is to be fixed in the course of the manufacture of the device in such a way that when the float 2 is held in the position mentioned above, the lead switch 6 is closed in accordance with the position of the corresponding permanent magnet 5.

The float 2 whose operating principle resides in the selective opening and closing of the lead switch 6 is only required to have freedom of motion approximately along the entire length of the limit switch. The distance "l" over which the float is required to move as shown in the diagram can be very small.

Now the operation of this device will be described. As shown in FIG. 4(A), the float 2 retains itself at its raised position by virtue of its own buoyance when the liquid surface F remains at an amply high level. At this time, the lead switch 6 is open and the display unit 12 is kept in its inoperative OFF state.

As the liquid surface F gradually falls and eventually reaches the aforementioned fixed level X—X, the float 2 which has followed the liquid surface assumes a position opposite the lower limit means 4 as shown in FIG. 4(B) and causes the permanent magnet 5 to close the lead switch 6. Consequently, the circuit of the display unit 12 is closed and the display unit is actuated to give a warning that the fuel supply is running short.

The resistance means R which is inserted in the circuit system 11 serves the purpose of protecting the filament of the lamp from surge contents. It is incorporated in the circuit when such prevention is required. As the display unit 12, there also may be used either an electroluminescent diode or an electromagnetic oscillation type buzzer.

In some situations, the display unit may be desired to function at all times that the tank contains an ample liquid supply. This can be accomplished by fixing the position of the lead switch so that the lead switch is closed when the float reaches its highest position and the switch is opened as the float descends with the decrease of the liquid supply.

Figure 6:
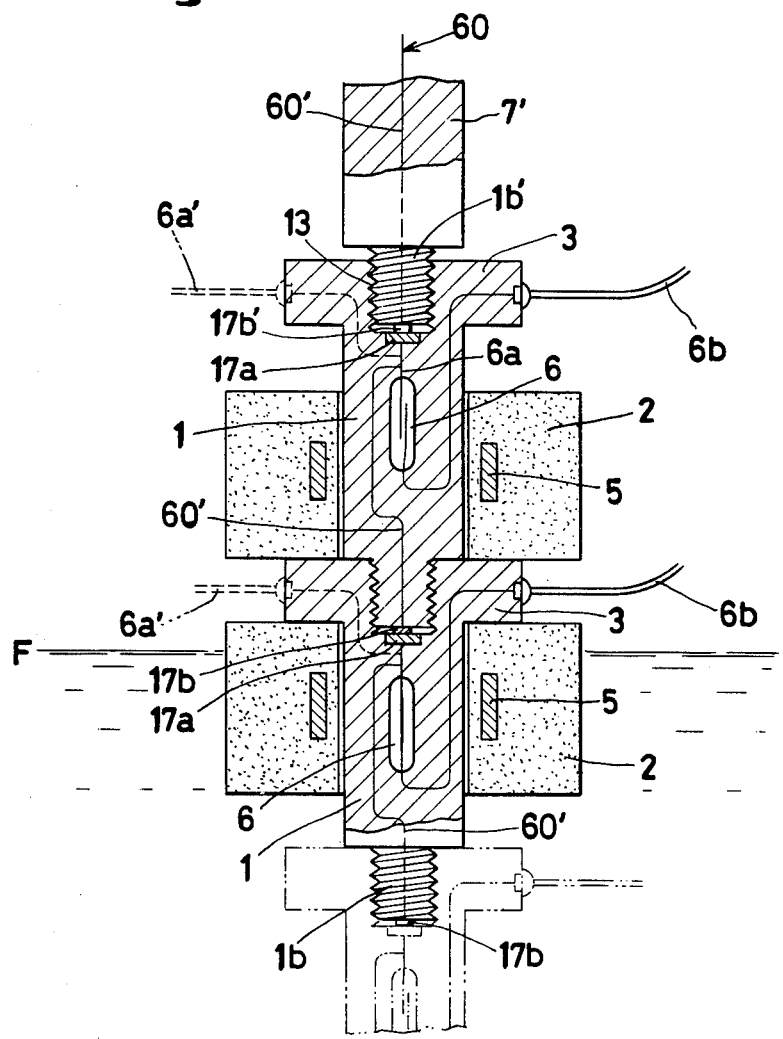
FIG. 6 is a sectioned explanatory diagram illustrating the device of this invention being operated as a liquid level indicator.
Figure 7:
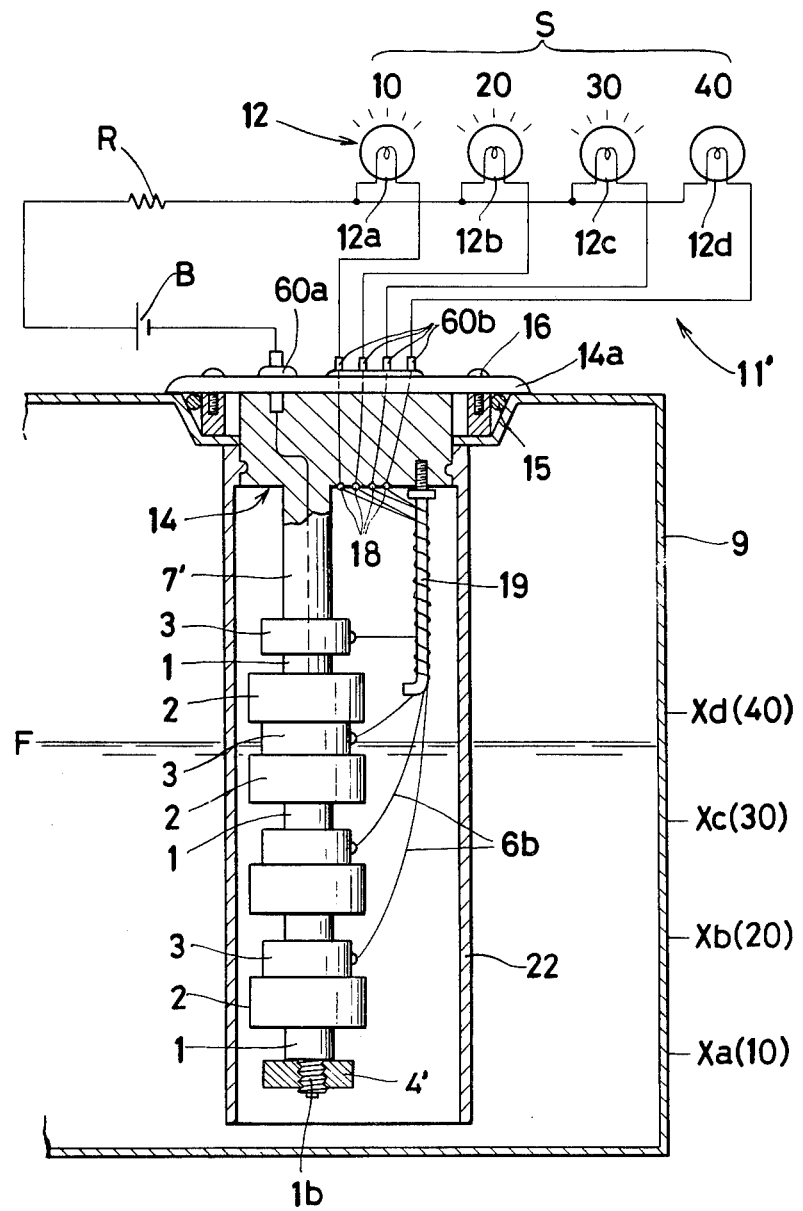
FIG. 7 is an explanatory diagram illustrating the condition in which the liquid level indicator of FIG. 6 is operated.
Figure 8:
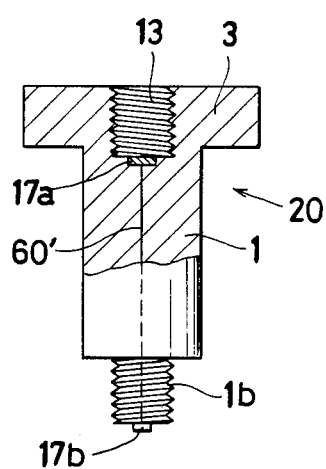
FIG. 8 is a sectional view of one preferred embodiment of a spacer usable where a plurality of liquid level indicators of the construction shown in FIG. 6 and FIG. 7 are installed one on top of another.

FIGS. 6–8 represent other preferred embodiments of the present invention wherein a multiplicity of devices of the aforementioned construction are piled up one on top of another to form a detection system for determining the liquid level. The detecting device of the aforementioned preferred embodiment is only intended to determine the presence or absence of a liquid at a given standard point. The device of the preferred embodiment of FIG. 6 is intended to provide continuous digital indication of the liquid supply in a given container. In this preferred embodiment, the leading end of the barrel 1 is formed in the shape of a threaded portion 1b with an external thread in place of a shank found in the aforementioned preferred embodiment. To admit this threaded portion, an internally threaded portion 13 is formed inwardly from the opposite surface of the upper limit means 3 partly into the depth of the barrel. Thus, the multiplicity of devices can be assembled by inserting the float 2 around the barrel 1, then spirally driving the externally threaded portion 1b at the leading end of the barrel into the internally threaded portion 13 formed inwardly from the surface of the upper limit means of the next lower detecting device and joining the remaining detecting devices successively by repeating this procedure.

The uppermost detecting device in this assembly may possess a structure wherein the device proper is fastened to the tank 9, for example, with a suitable supporting rod 7 as illustrated in FIGS. 1-4. For the detecting devices at all the steps to be uniformized in structure, it is desirable that the supporting rod 7 be replaced by a supporting rod 7' which is provided at its leading end with an externally threaded portion 1b' equivalent to the externally threaded portion 1b fitted to the internally threaded portion 13 of the detecting device. In the preferred embodiment illustrated in FIG. 7, the supporting rod 7' is provided at its upper end with a stationary block 14 adapted to be attached to the tank 9. When the cup portion 14a of the stationary block 14 is tightly attached to the upper wall of the tank by the medium of seal means 15 or fixing means 16 such as bolts, a series of successively joined detecting devices can be hung down inside the tank in the vertical direction. In the circuit system 11', as many lamps or other suitable display means 12 as the detecting devices are simply arranged in parallel connection.

One end 6a of each lead switch is only required to be connected to the common line 60. To minimize the number of lead wires required to be externally extended when all the detecting devices are assembled together and to eliminate the possibility of individual lead wires becoming entangled with one another or getting wrapped around the floats to the extent of impeding their free movement, the wires should be distributed as illustrated in FIG. 6. To be specific, a terminal 17a of the conductor is positioned on the bottom of the internally threaded portion 13 of each detecting device and a terminal 17b is positioned at the leading end of the externally threaded portion of each detecting device so that this terminal 17b comes into contact with the terminal 17a of the next lower detecting device when the externally threaded portion is screwed into the internally threaded portion of the next lower detecting device. At the time that each detecting device is being formed, a conductor 60' is buried in the interior of the barrel so as to establish an electrical connection between the two terminals. At the same time, the conductor 60' is electrically connected to one of the lead wires 6a of the lead switch. The other lead wire 6b is externally extended from a suitable position of each detecting device such as, for example, one position in the lateral edge of the upper limit means 3. Also the supporting rod 7' which is attached to the uppermost detecting device is provided at the leading end of its externally threaded portion with a terminal 17b' adapted to come into contact with the terminal 17a of the internally threaded portion of the detecting device. The lead wire 60' from this terminal is similarly buried at the time that the stationary block and the supporting rod are formed. It is externally extended through the outer terminal 60a to the circuit system 11'. When the detecting devices are assembled by joining their externally threaded portions and internally threaded portions as described above, the wire distribution of the common line system can be completed at the same time.

The remaining lead wire 6b is effectively distributed when it is connected by soldering or by means of a plug or socket to the corresponding terminal 18 disposed on the stationary block 14 and then connected to the corresponding display unit 12 through the medium of an external terminal 60b. The possibility that individual lead wires laid from the detecting devices to the stationary block 14 will entangle with one another or will interfere with the free movement of the floats may be avoided by having a rod member 19 hang down from the stationary block at a position properly separated from the float, with the upper end of the rod member screwed into the block, and then having otherwise loose lead wires wound neatly around this rod member as illustrated in FIG. 7. As regards the common line, if the work of having the terminal buried completely within the barrel proves troublesome, the terminal may be extended out of each detecting device as shown by an imaginary line 60' and then connected to the external circuit system. (See FIG. 6.)

Now the operation of the present system will be described. Let Xa, Xb, Xc and Xd stand for the successively higher planes fixed for the actuation of the respective lead switches and 12a, 12b, 12c and 12d stand for lamps or other suitable display units connected to the lead switches which are actuated at the respective fixed planes Xa through Xd as illustrated in FIG. 7. All the lead switches falling below the highest fixed plane that is surpassed by the liquid surface F permit power source connection and cause the corresponding lamps to light up because their corresponding floats are in their raised positions owing to the buoyancy exerted thereon by the liquid. Since in the illustrated embodiment, the liquid surface F surpasses the fixed plane Xc but fails to reach the fixed plane Xd, the lead switches up to the fixed plane Xc, namely the lead switches corresponding to the fixed planes Xa, Xb and Xc are connected to the power source, causing the corresponding lamps 12a, 12b and 12c to light up. In the meantime, the lead switch corresponding to the fixed plane Xd is opened because the corresponding float remains in its lowered position. Thus, the lamp 12d remains unlit. A look at the bank of lamps in their respective states mentioned above allows the observer to tell that the liquid supply is at least up to the fixed plane Xc at the time of the observation. For more accurate determination of the liquid level, therefore, it is advisable to dispose near each lamp a scale graduated for liquid level in the neighborhood of the corresponding fixed plane. Where the unit of the liquid volume being detected is desired to be varied or where uniform graduation is desired in spite of lack of uniformity in the shape of the fuel container, there may be used a spacer 20 of a length meeting the purpose as illustrated in FIG. 8 so as to properly adjust the length of the barrel 1 of each detecting device. This structure is similar to that of the detecting device of FIGS. 6–7, except for omission of the internal lead switch and the float. In the case of a detecting device having a structure different from that illustrated, the same purpose can naturally be met by using a spacer which suits the particular detecting device.

The housing 22 which keeps firm hold of the stationary block 14 at the upper end, opens at the lower end and completely embraces the liquid level detecting system inside so as to serve the purpose of preventing possible vibration of the liquid surface from causing erroneous detection of liquid level.

Figure 9:
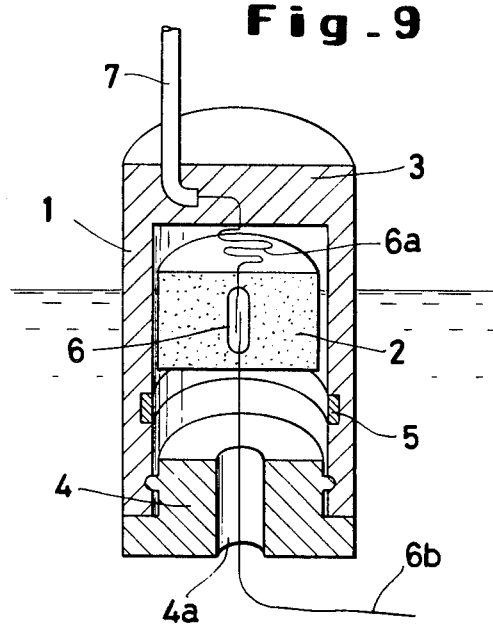
FIG. 9 is a sectioned explanatory diagram of the third preferred embodiment of the liquid level detecting device of this invention.

FIG. 9 represents the third preferred embodiment of this invention. A float internally retaining a lead switch 6 is enclosed in a hollow barrel 1. Within the cavity of the barrel, the float enjoys freedom of vertical movement between the upper limit means 3 and the lower limit means. At the position at which the lead switch is desired to be actuated in accordance with the vertical movement of the float 2, a permanent magnet 5 is disposed along the inner surface of the barrel. The lower limit means 4 has a through hole 4a to provide communication between the liquid held outside and the liquid held inside the barrel. Particularly in this structure, an independent housing similar to the housing 22 of the system of FIG. 7 is formed by the barrel itself, rendering the entire device stable to possible vibration of the liquid surface. The two lead wires 6a, 6b from the lead switch 6 are given ample length to avoid interfering with the movement of the float 2. They are desired to possess sufficient flexibility. The lower limit means 4 is so designed as to be readily set in position around the open end of the barrel, to ensure ease of assembly after insertion of the float in the barrel.

Figure 10:
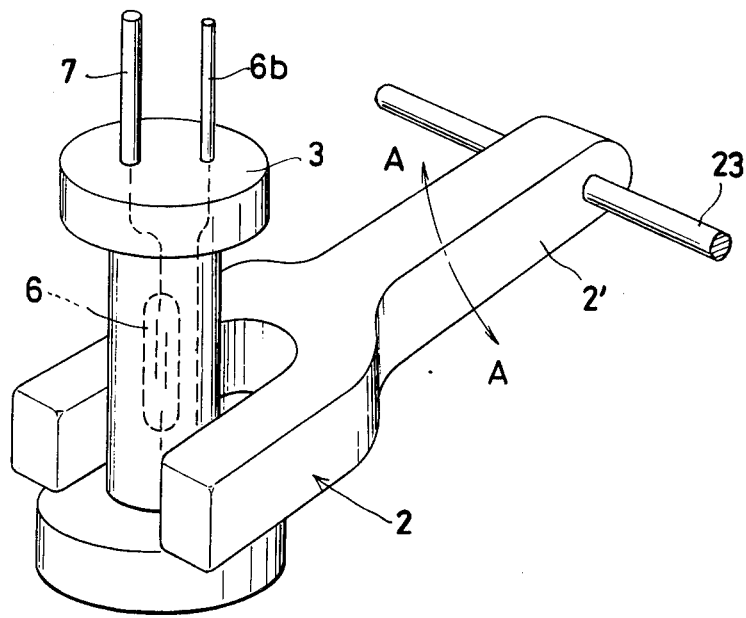
FIG. 10 is an explanatory diagram of the fourth preferred embodiment of the device of this invention.

The preferred embodiment illustrated in FIG. 10 is a modification in the sense that the linear movement of the float 2 of the aforementioned embodiment is changed to an arcuate movement. The float 2 is formed in the general shape of a horseshoe and the rod member 2' which extends from the deepest point of the curve has its leading end rotatably fixed on a shaft 23, so that the float 2 will rotatably move up or down around the shaft 23 as indicated by the arrows A—A in the diagram in accordance with the vertical movement of the liquid surface. A barrel 1 internally retaining a lead switch 6 is disposed in the space embraced inside the horse-shoe. The upper and lower limit means 3, 4 are disposed at the top and bottom of the barrel to limit the vertical movement of the float 2. In the float, two permanent magnets (not shown) are buried one each on the portions of the float opposed to each other across the lead switch 6, so that the lead switch will be selectively actuated in accordance with the position assumed by the float 2.

As described above, the liquid level detecting device of the present invention finds great utility as means for issuing alarms regarding the liquid supply situation or for determining liquid levels such as in fuel tanks, liquid reservoirs for hydraulic systems and cylinder interiors, where it is found imperative to determine the presence or absence of liquids at all times. It enjoys numerous advantages including very simple structure, high operational reliability, great feasibility of manufacture, ease of assembly and high economy.

What is claimed is:

1. A liquid level detecting device, comprising a float provided with an inner hole internally incorporating permanent magnets and a barrel inserted through the inner hole of said float to guide the movement of the float and internally provided with a magnetically operatable lead switch, whereby the movement of the float which constantly follows the movement of a liquid surface selectively actuates the lead switch inside the barrel to permit detection of the liquid said float being formed in the shape of a horseshoe substantially to enclose the barrel and said float being provided with a rod member with a portion of the rod member rotatably fastened on a stationary means so as to permit the float to enjoy freedom of vertical movement relative to the barrel and selectively actuate the lead switch in the barrel.

2. A liquid level detecting device for determining the presence or absence of a liquid, which comprises a hollow barrel provided in the inner wall thereof with permanent magnets and a float incorporating a lead switch and held inside the cavity formed inside the barrel, whereby the movement of said float which constantly follows the movement of the liquid surface selectively actuates the lead switch inside the barrel to permit detection of the presence or absence of the liquid.

* * * * *